J. E. KEPPEL.
VALVE.
APPLICATION FILED APR. 24, 1915.
1,214,553. Patented Feb. 6, 1917.
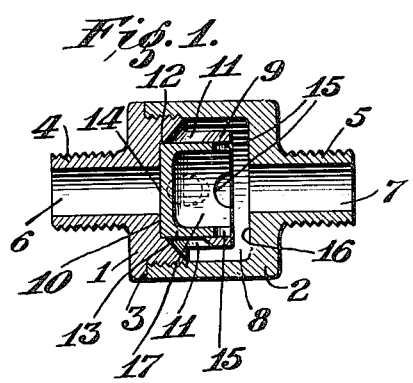
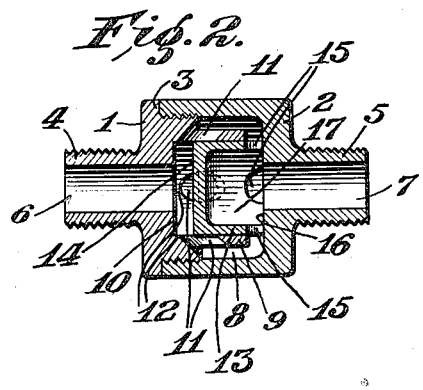
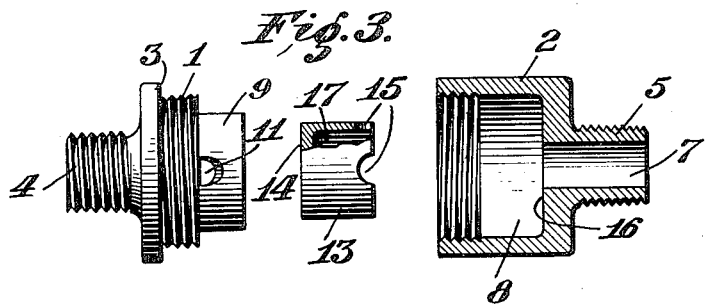
Witnesses:
G. A. Pennington
Stella Hill
Inventor:
Jesse E. Keppel,
By Bruce A. Elliott
his Atty

UNITED STATES PATENT OFFICE.

JESSE E. KEPPEL, OF ST. LOUIS, MISSOURI, ASSIGNOR TO VULCAN VALVE COMPANY, A CORPORATION OF MISSOURI.

VALVE.

1,214,553.

Specification of Letters Patent.   Patented Feb. 6, 1917.

Application filed April 24, 1915.   Serial No. 23,562.

*To all whom it may concern:*

Be it known that I, JESSE E. KEPPEL, a citizen of the United States, residing in the city of St. Louis and State of Missouri, have invented new and useful Improvements in Valves, of which the following is a specification.

This invention relates to a novel valve for use in air pumps and similar applications.

It has for its object to provide a valve which shall be quick in action, and which will permit the ready movement of the air, or other medium, in one direction, but will securely prevent its passage in the opposite direction.

Valves of the general character to which my invention relates, and possessing more or less efficiency, have heretofore been constructed; but so far as I am aware they have all possessed the disadvantage of not always seating accurately and promptly, especially after extended use; the construction of the valve was such that after use for a greater or less period of time the seat would be unevenly worn away, permitting leakage; and they lacked the quick action necessary for the highest efficiency.

My invention aims to overcome the objections noted, and to provide a valve of high efficiency and reliability in operation, of simple construction, and operating in such manner that it will always seat properly, and cannot wear away the seat unevenly.

I have illustrated the invention in the accompanying drawing, in which—

Figure 1 is a longitudinal sectional view of my improved valve showing the valve proper seated; Fig. 2 is a similar view with the valve proper unseated; and Fig. 3 is a view, partly in section and partly in elevation, showing the parts of the valve separated.

Referring now to the drawing, the numeral 1 indicates the inlet member of a valve-casing, the same being preferably cylindrical in shape, and screwed into the end portion of the second or outlet member 2 of the casing, the part 1 being provided with a shoulder 3 which engages the edge of the portion 2. Each of the members 1, 2, is provided with a screw-threaded extension 4, 5, respectively, provided with an inlet opening 6 and outlet opening 7, respectively. The screw-threaded extensions 4, 5, are for attachment in the ends of pipes, or one of said members could be used for screw-threaded engagement with the tire of a wheel, or with a tank to be filled with compressed air, and the other connected with a pipe, all of which will be clearly understood by those skilled in the art. The part 2 of the valve casing is hollow to provide a valve chamber 8, and formed integral with the member 1 of the casing, and extending from the valve seat 10 into the valve chamber is an annular guide in the form of a wall 9 of less diameter than the chamber 8 and in this way an outer duct is formed around the guide surrounding the valve seat 10 formed in the part 1 of the casing. The guide 9 is cylindrical in shape, and is provided with four or more apertures 11 located with their inner ends close to the seat 10, but so as to leave a shoulder 12, necessitating a slight movement of the valve before the apertures 11 will be uncovered.

The valve-member or valve proper is indicated by 13, and is in the form of a hollow cylinder open at one end, and snugly fitting within the guide 9, that is, as an air-tight piston, and having its opposite end closed and providing a flat bearing surface 14 for seating on the seat 10. The edge portion of the valve surrounding its open end is provided with a series of recesses 15 to permit the passage of the air around the valve when the same is unseated. The valve chamber 8 is provided with a face or secondary seat 16 surrounding the port 7 which operates as a stop to limit the opening movement of the valve.

In operation, assuming the member 5 to be attached, say, to a tank to be filled with air, and the part 4 to the pipe of an air pump, as air is forced through the port 6 the valve 13 will be unseated, and its recessed edge forced against the seat 16, thereby uncovering the openings 11. The air then passes through these openings into the annular space surrounding the guide 9 and through the recess 15 to the port 7, and thence into the tank. As soon as the pressure falls on to the seating side of the valve the back pressure of the air from the tank will at once throw the valve 13 in the opposite direction described, causing its flat surface 14 to bear on the seat and preventing the escape of air from the tank. The valve 13 is cup-shaped, as shown, providing a recess 17, and the pressure of the air on the bottom of this recess not only moves the valve to its seat as stated, but exerts uniform pressure in a lateral direction on the walls of the valve, tending to cause the movement of said valve in an absolutely right line. In addition to this function, should the valve 13 be made of hard rubber, or other slightly yielding material, the pressure of the air on the walls of the valve will tend to force them outward and form a perfect air-tight connection between said valve and the walls of the guide 9. The guide 9 and the valve 13 being cylindrical, and the valve seating snugly within the guide, it follows that said valve will be prevented from rocking or tilting in its movement, and all parts of the bearing portion 14 caused to engage the seat 10 simultaneously. This prevents wearing away of the seat or the formation of ridges therein, so that the danger of leakage is reduced to the minimum. By the provision of the shoulder 12, I insure that the valve shall be given considerable impetus in the unseating movement before the apertures 11 are opened, thus assuring the full throw of the valve in the unseating direction, and preventing any tendency to sluggish movement of the valve by momentary equalization of pressure on opposite sides thereof.

I claim:

1. A device of the class described comprising a casing having a valve chamber and a seat portion with a valve seat, a guide surrounding the valve seat supported by said seat portion and extending from said seat into said chamber at a distance from the walls thereof, and a valve slidably mounted in said guide.

2. A device of the class described comprising a casing having a valve chamber and a seat-portion with a valve seat, a cylindrical guide surrounding the valve seat supported by said seat portion and extending from said seat into the casing at a distance from the walls thereof, and a cup form valve slidably mounted in said guide.

3. A device of the class described comprising a casing having a valve chamber and a seat portion with a valve seat, an annular guide wall surrounding said valve seat supported by said seat portion and extending from said seat into said chamber at a distance from the walls thereof, said guide wall being provided with apertures for letting a fluid pass into or out of the space surrounded by said wall and a valve slidably mounted in said guide.

4. A device of the class described comprising a casing having a valve chamber and a seat-portion with a valve seat, a cylindrical guide wall surrounding the valve seat supported by said seat-portion and projecting into said chamber at a distance from the walls thereof, said guide being provided with apertures located adjacent to said valve seat for letting a fluid pass into or out of the space surrounded by said wall, and a valve slidably mounted in said guide.

5. A device of the character described comprising a casing having a valve chamber and a seat-portion with a valve seat, a cylindrical guide surrounding the valve seat supported by said seat portion and projecting into said chamber at a distance from the walls thereof, said wall having inlet openings therethrough, and a cup-shaped valve slidably mounted in said guide for controlling the flow of a fluid through said openings.

6. A device of the class described comprising a casing having ports at opposite sides and having a valve chamber communicating with said ports and valve seats surrounding the same, a cylindrical guide surrounding one of said seats and projecting into said chamber at a distance from the walls thereof and terminating short of the opposite valve seat, said guide being provided with apertures, and a cup-shaped valve slidably mounted in said guide and having a flat bottom for bearing on the seat in said guide, and an open end having recesses in its edge portion.

7. A device of the class described comprising a casing having ports at opposite sides and providing a valve chamber communicating with said ports and valve seats surrounding the same, a cylindrical guide surrounding one of said seats and projecting into said chamber at a distance from its walls and terminating short of the other seat, said guide being provided with circumferential apertures and having an annular shoulder surrounding said seat between the seat and the edge of said apertures, and a hollow cylindrical valve slidably mounted in said guide and having a flat bottom for engagement with the seat in said guide, and an open end having recesses in its edge.

8. A device of the class described comprising a two-part casing having ports in their opposite side walls and providing a valve chamber communicating with said ports and opposite valve seats surrounding the same, a cylindrical guide formed integral with one member of said casing and surrounding the seat thereon and projecting into said valve chamber at a distance from the wall thereof and terminating short of the other seat, said guide being provided with circumferential apertures, and a hollow cylindrical valve mounted in said guide and having a flat bottom for engagement with the seat in said guide, and an open end provided with recesses in its edge.

9. A device of the class described comprising a casing inclosing a valve chamber, and having a seat portion with a seat and an inlet opening through said seat, said casing having an outlet opening opposite said inlet opening, a guide surrounding said seat and spaced from the wall of said casing to form an outer duct on the outer side of said guide, communicating with said outlet opening, a valve-member mounted to slide to and fro in said guide, said guide having an aperture effecting communication from said inlet opening to said outer duct when said valve member is in its open position, but normally closed by said valve-member resting on said seat, said valve-member engaging said casing to limit the opening movement of said valve-member and constructed so as to maintain the said communication between said outer duct and said outlet opening when said valve-member is in its open position.

10. A device of the class described comprising a casing inclosing a valve chamber and having a seat portion with a seat and an inlet opening through said seat, said casing having an outlet opening opposite said inlet opening, a guide surrounding said seat and spaced from the wall of said casing, a valve member mounted to slide to and fro in said guide, said guide having an aperture to communicate with said inlet opening and direct a fluid through the wall of said guide into the valve chamber when the valve member is in its open position, but normally closed by said valve member resting on said seat, said guide constructed so that when said valve member is on said seat said outlet opening is in communication with the space in said valve chamber surrounding said guide, said valve member being of cup form and fitting as an air-tight piston in said guide to enable the back pressure to move said valve member onto said seat, said valve engaging said casing to limit the opening movement of said valve member, and having recesses in the edge of the wall thereof adjacent said outlet opening to maintain communication between said valve chamber and said outlet opening when said valve member is in its open position.

11. A device of the class described comprising a casing consisting of an inlet member and an outlet member connected together to form a valve chamber therebetween, said inlet member provided with a seat and an inlet opening through said seat, said outlet member having an outlet opening opposite said inlet opening, a guide surrounding said seat carried by said inlet portion and extending into said valve chamber, a valve-member mounted to slide to and fro in said guide, said guide having an aperture therethrough for directing a fluid around said valve member and guide when said valve member is in its open position, but normally closed by said valve member resting on said seat, said valve member having a recess on the side thereof toward said outlet opening, said valve member engaging said outlet member to limit the opening movement of said valve member, said valve member also having recesses in the side wall thereof adjacent said outlet opening for directing a fluid from said valve chamber around said guide into said outlet opening when said valve member is in its open position.

In testimony whereof, I have hereunto set my hand.

JESSE E. KEPPEL.